(12) United States Patent
Platner et al.

(10) Patent No.: US 7,647,244 B2
(45) Date of Patent: Jan. 12, 2010

(54) METHOD FOR PROVIDING A CERTIFICATE FOR AN ONLINE PRODUCT

(76) Inventors: Michael Gary Platner, 1401 S. Ocean Blvd., Apt. 908, Pompano Beach, FL (US) 33062; William P. Foley, 7554 Stirling Rd., Apt. 207, Hollywood, FL (US) 33024-1560

( * ) Notice: Subject to any disclaimer, the term of this patent is extended or adjusted under 35 U.S.C. 154(b) by 517 days.

(21) Appl. No.: 09/888,345

(22) Filed: Jun. 22, 2001

(65) Prior Publication Data

US 2002/0103723 A1 Aug. 1, 2002

Related U.S. Application Data

(60) Provisional application No. 60/264,970, filed on Jan. 29, 2001.

(51) Int. Cl.
*G06Q 30/00* (2006.01)
(52) U.S. Cl. .................. 705/26; 705/1; 705/27
(58) Field of Classification Search .............. 705/14, 705/25, 26, 27
See application file for complete search history.

(56) References Cited

U.S. PATENT DOCUMENTS

| 5,080,364 | A | * | 1/1992 | Seidman ..................... 463/17 |
| 5,710,886 | A | | 1/1998 | Christensen et al. |
| 5,884,277 | A | | 3/1999 | Khosla et al. |
| 5,970,469 | A | | 10/1999 | Scroggie et al. |
| 6,002,771 | A | | 12/1999 | Nielsen |
| 6,134,533 | A | * | 10/2000 | Shell ........................... 705/26 |
| 6,169,975 | B1 | * | 1/2001 | White et al. .................. 705/44 |
| 6,175,823 | B1 | | 1/2001 | Van Dusen ................... 705/26 |
| 6,336,098 | B1 | * | 1/2002 | Fortenberry et al. ......... 705/14 |
| 6,360,206 | B1 | | 3/2002 | Yamashita |
| 6,370,514 | B1 | * | 4/2002 | Messner ...................... 705/14 |
| 6,658,390 | B1 | * | 12/2003 | Walker et al. .................. 705/5 |
| 2001/0007098 | A1 | * | 7/2001 | Hinrichs et al. .............. 705/14 |

(Continued)

FOREIGN PATENT DOCUMENTS

WO WO 99/30256 6/1999

OTHER PUBLICATIONS

Giftcertificates.com web pages captured via the WayBackMachine (archieve.org) anddated Sep. 4, 2000.*

(Continued)

*Primary Examiner*—Jeffrey A. Smith
*Assistant Examiner*—Michael A. Misiaszek
(74) *Attorney, Agent, or Firm*—Mintz, Levin, Cohn, Ferris, Glovsky and Popeo, PC (57) ABSTRACT

The present invention relates to a method for providing a certificate for an online product. A certificate comprising an authorization code is provided. The authorization code is unique and associated with characteristics that are recorded for tracking purposes. A purchaser receives the certificate, such as by purchasing a physical certificate. The certificate is provided to a user from the purchaser. The user then connects to a system of networked computers and finds the web site indicated on the certificate. The user enters the authorization code on the web site where indicated on the web site. In response to entering the authorization code, the user is provided with an online product at no fee, a reduced fee, or at a standard price.

8 Claims, 5 Drawing Sheets

U.S. PATENT DOCUMENTS

| | | | |
|---|---|---|---|
| 2001/0037236 A1* | 11/2001 | Dixon et al. | 705/14 |
| 2001/0049627 A1 | 12/2001 | Simpson | |
| 2002/0002538 A1 | 1/2002 | Ling | |
| 2002/0022962 A1* | 2/2002 | Richardson | 705/1 |
| 2002/0032604 A1 | 3/2002 | Watanabe et al. | |
| 2002/0046046 A1 | 4/2002 | Barrott et al. | |
| 2002/0128903 A1* | 9/2002 | Kernahan | 705/14 |
| 2002/0178071 A1* | 11/2002 | Walker et al. | 705/26 |
| 2003/0212611 A1* | 11/2003 | Barrott et al. | 705/27 |

OTHER PUBLICATIONS

"Giftcertificates.com Launches First Line of Personal-Interest Gift Certificates Available Online"; PR Newswire; Oct. 11, 2000.*

"Funeral services going online Online obituaries and shopping for burial options on the Internet are a growing trend." Margaret Stafford, Associated Press. York Daily Record. York, Pa.: Nov. 3, 1999. Retrieved via ProQuest.*

"CyberSource Acquires ExpressGold to Provide Online Merchants With Gift Certificate and Promotional Services." PR Newswire. New York: Jan. 11, 2000. Retrieved via ProQuest.*

Amazon.com: Help/Payment Methods We Accept/Gift Certificates, http://www.amazon.com/exec/obidos/tg/browse/-/518226/ref+hp_hp_1.../103-7713140-375182; at the latest Oct. 9, 2001.

Shop Microsoft: Common Questions; http://www.shop.microsoft.com/helpdesk/CommonQuestions.asp; at the latest Oct. 9, 2001.

Buying Time Prepaid Phonecards; http://www.ftc.gov/bcp/conline/pubs/products/buytime; at the latest Oct. 9, 2001.

Dealcatcher.com—All Deals—p. 1—Deals Found: 841; http://www.dealcatcher.com/deals.asp?view_type+6; at the latest Oct. 23, 2001.

PCT/US02/02687 Search Report, Jan. 29, 2002.

* cited by examiner

METHOD FOR PROVIDING A CERTIFICATE FOR AN ONLINE PRODUCT

RELATED APPLICATIONS

This application claims priority from U.S. Provisional Patent Application No. 60/264,970, to Platner, et al., entitled "Certificate for Online Goods or Services," filed Jan. 29, 2001, which is incorporated herein by reference in its entirety.

FIELD OF THE INVENTION

The present invention relates to providing a certificate for an online product over a system of networked computers, such as the Internet.

BACKGROUND OF THE INVENTION

Computer systems in general are known. A typical system comprises a computer, keyboard, mouse, and a monitor. Additionally, the computer comprises a central processing unit ("CPU") and random access memory ("RAM") and allows various software programs to be used. Further, the computer might comprise a modem, an Ethernet card or other similar device for connecting to a system of networked computers, such as the Internet.

The Internet provides a useful technique for making information available to a variety of individuals each of whom may be located at a variety of different locations. Indeed, within the vast Internet environment, individuals can access information tools from remote locations.

The Internet, which originally came about in the late 1960s, is a computer network made up of many smaller networks spanning the entire globe. The host computers or networks of computers on the Internet ("hosts") allow public or private access to databases containing information in numerous areas of expertise. Hosts can be sponsored by a wide range of entities including, for example, universities, government organizations, commercial enterprises and individuals.

Internet information is made available to the public through servers running on the hosts. The servers make documents or other files available to those accessing the hosts' site. Such files can be stored in databases and on storage media such as optical or magnetic storage devices, preferably local to the host.

Networking protocols can be used to facilitate communications between the host and a requesting client. TCP/IP ("Transmission Control Protocol/Internet Protocol") is one such networking protocol. Computers on a TCP/IP network utilize unique identification ("ID") codes, allowing each computer or host on the Internet to be uniquely identified. Such codes can include an IP ("Internet Protocol") number or address, and corresponding network and computer names.

Created in 1991, the World-Wide Web ("Web" or "WWW") provides access to information on the Internet, via web sites, and allows a user to navigate Internet resources intuitively, without IP addresses or other specialized knowledge.

The proliferation of the Internet, in particular the World Wide Web, makes a large amount of information, goods, and services, accessible to anyone connected to the Internet. In order to access the Internet, a user typically subscribes to an on-line service provider. Using, for example, a modem coupled to a computer, the user contacts the service provider to which they have become a member and allows password verified access, and the service provider, in turn, connects the user to the Internet. The web consists, generally, of voluminous "sites," called "web sites." Various web sites contain information and provide online products of various types such as purchasing an automobile or clothing, to providing access to information such as online encyclopedias and newspapers. Web documents are stored in HTML format in association with a "server" and a "database" on remote network servers and network database computers.

The Web comprises hundreds of thousands of interconnected "pages," or documents, which are parts of various web sites and which can be displayed on a user's computer monitor. The web pages are provided by hosts running special servers. Software that runs these web servers is relatively simple and is available on a wide range of computer platforms including PC's. Equally available is web browser software, used to display web pages as well as traditional non-web files on the user's system.

Recent years have been marked by a societal and technological revolution driven by the convergence of the data processing and data storage industry with consumers via the Internet. One of these technologies is the Internet-related distribution of documents, media and programs. With the expansion that has occurred, businesses and consumers have direct access to a wide range of documents, media and even computer programs.

Hypertext Markup Language ("HTML"), which has been a documentation language of the Internet and World Wide Web for years offers direct links between pages and other documentation on the Internet and a variety of related data sources which were at first text and then evolved into not only text but various media formats and progressed towards interactive documents for submission and retrieval of information. This even further exploded the use of the Internet and World Wide Web. It was now possible for a web user to spend hours going through document after document and interact with online businesses and databases.

The Web is based on the concept of hypertext and a transfer method known as "HTTP" ("Hypertext Transfer Protocol"). HTTP is designed to run primarily over TCP/IP and uses the standard Internet setup, where a server issues the data and a client displays or processes it. One format for information transfer is to create documents using HTML. HTML pages are made up of standard text as well as formatting codes indicating how to display the page. The browser reads these codes to display the page.

Each web page may contain pictures and sounds in addition to text. Associated with certain text, pictures or sounds are connections, known as hypertext links, to other pages within the same server or even on other computers within the Internet. For example, links may appear as underlined or highlighted words or phrases. Each link is directed to a web page by using a special name called a URL ("Uniform Resource Locator"). URLs enable the browser to go directly to the associated resource, even if it is on another web server.

There is a long felt need for providing users with a physical certificate containing an authorization code that can be redeemed for an online product. This need is especially true in the funeral industry, such that a user can purchase a physical certificate for an online product to provide to families and friends without having to be experienced in using or purchasing online products.

SUMMARY OF THE INVENTION

The present invention relates to a physical certificate for an online product. One embodiment comprises a method comprising the steps of: providing a certificate comprising an authorization code; selling the certificate; providing the certificate to a user; connecting to a web site associated with the certificate over a system of networked computers; entering the authorization code on the web site; and providing an online product to the user in response to the step of entering the authorization code on the web site.

Another embodiment comprises a method comprising the steps of: selling a plurality of certificates to a purchaser; providing the plurality of certificates to the purchaser after the step of selling, each of the certificates comprising a unique authorization code, and further wherein the plurality of certificates are each redeemable for an online product at no fee; providing at least one of the plurality of certificates to a user; connecting to a web site associated with the certificate over a system of networked computers; entering the authorization code on the web site by the user; and providing the online product to the user at no fee in response to the step of entering the authorization code.

Another embodiment comprises a method comprising the steps of: providing a plurality of certificates, each of said certificates comprising an authorization code, wherein said authorization code of each of said plurality of certificates is different; negotiating a reduced fee for an online product by a purchaser, wherein the plurality of certificates are redeemable for the online product at the reduced fee; providing the plurality of certificates to the purchaser; providing one of the plurality of certificates to a user; connecting by the user to a web site associated with the certificate over a system of networked computers; entering by the user the authorization code on the web site; paying for the online product at the reduced fee by the user; and obtaining the online product by the user in response to the step of paying for the online product.

A technical advantage of an embodiment of the present invention is that users may obtain an online product by physically purchasing a certificate. The certificate authorizes the purchase and/or use of the online product. Moreover, a user may provide an online product to another user by giving a physical certificate to such other user.

Another technical advantage of an embodiment of the present invention is that an online product can be sold without the purchaser or the user being online; physical certificates can be sold to users that may redeem the certificates online for the online product. This provides further distribution channels for the online product.

Another technical advantage of an embodiment of the present invention is that users without experience in online services can purchase certificates that provide an online product. This is especially advantageous in the funeral industry, as many of the individuals involved in purchasing products related to the funeral industry are of an older generation that may have less experience in dealing with web sites and/or online services. Thus, such less experienced users can purchase online products for others without having to be online.

Other aspects, embodiments, and technical advantages of the present invention are set forth in or will be apparent from drawings, claims, and the disclosure of the invention, or may be learned from the practice of the invention. Such other aspects, embodiments, and technical advantages shall be deemed to be a part of the invention as if they were disclosed.

BRIEF DESCRIPTION OF THE DRAWINGS

Reference is now made to the following description and the accompanying drawings, wherein like reference numerals represent like parts, in which.

DETAILED DESCRIPTION OF AN ILLUSTRATIVE EMBODIMENT

For convenience in the ensuing description, the following explanations of terms are adopted. However, these explanations are intended to be exemplary only. They are not intended to limit the terms as they are described or referred to throughout the specification. Rather these explanations are meant to include any additional aspects and/or examples of the terms as described and claimed herein.

To access a system in a "secure manner," as used herein, means to access a system and/or a web site in an exclusive, private manner. Accessing the system and/or web site in a secure manner may be implemented using an alphanumeric pin code, secret password, biometric information (e.g., a fingerprint, voice or retinal recognition), knowledge based information (e.g., a mother's maiden name), any combination of the above, or the like. Encryption methods can also be used to provide such access.

A "computer," as used herein, includes any general-purpose machine that processes data according to a set of instructions that is stored internally either temporarily or permanently, including, but not limited to, a general purpose computer, workstation, laptop computer, personal computer, set top box, web access device (such as WEB TV™ (Microsoft Corporation)), television interfaces, kiosks, cable television, satellite television, broadband network, an electronic viewing or listening device, wireless devices, such as a personal digital assistant ("PDA"), cellular or mobile telephones, an electronic handheld unit for the wireless receipt and/or transmission of data, such as a BLACKBERRY™ (Research In Motion Limited Corporation), or the like.

"Electronic connection," as used herein, is any electronic connection, including connections via hardwire, Ethernet, token ring, modem, digital subscriber line, cable modem, wireless, radio, satellite, and combinations thereof. Such connections may be implemented using copper wire, fiber optics, radio waves, coherent light, or other media.

The "system of networked computers," as used herein, means any system of interconnected computers such as the Internet, an intranet, a virtual private network ("VPN"), a local area network ("LAN"), a wide area network ("WAN"), and the like. The system of networked computers may be any system of multiple computers that are directly or indirectly interconnected by any type of electronic connection. Further, as used herein, the term "network" refers to any such system of networked computers.

An "online product," as used herein, is any online good or service, such as informational services, services to find a particular web site or piece of information, goods available online, or the like. In one embodiment, the online product comprises an online product related to the funeral industry, for example, a product that enables a user to provide an online living memorial for a friend or relative, such as described in PCT Publication No. WO 01/29736 A2, entitled "On-Line System For Memorial, Legacy, Funeral And Remembrance Arrangements, Services And Transactions," which is herein incorporated by reference in its entirety and U.S. application Ser. No. 09/694,095, entitled "On-Line System For Memorial, Legacy, Funeral And Remembrance Arrangements, Services And Transactions," which is herein incorporated by reference in its entirety.

"The system," as used herein, is the system that provides the online product. Alternatively, the system is an entity that is selling the online product for a provider of the online product. Alternatively, the system is an entity that provides certificates for the online product, wherein the online product is provided by some other system. In one embodiment, the system is a computer or a web site hosted by a computer.

A "purchaser," as used herein, is an entity that receives a certificate from the system. The purchaser intends to sell the certificate to a user or give away the certificate to a user. Further, the purchaser could be a distributor that has received a number of certificates, such as from the system, and intents to sell these certificates to users. In one embodiment, the purchaser does not pay for the certificate, but instead is given the certificate at no charge. The purchaser can also receive a commission from the system when users redeem the certificate. Moreover, a purchaser may have obtained a reduced fee for the user that receives the purchaser's certificate, such that when the user redeems the purchaser's certificate the user pays a reduced fee for the online product. In one embodiment, the purchaser is a computer or a web site hosted by a computer.

A "user," as used herein, is an entity that purchases a certificate with intent to redeem the certificate for the online product. The user purchases the certificate from the system or from a purchaser. In one embodiment, the user is a computer or a web site hosted by a computer.

A "deceased" or "deceased individual" or "deceased party," as used herein, refers to a party that is no longer alive. A deceased individual can be a human or an animal, such as a pet. Preferably the deceased is a human.

The "funeral industry," as used herein, means some or all of the service providers in the fields of funeral services, cemeteries, death counseling, support groups, business that provide online products for funerals, businesses that provide funeral services, life insurance companies, death care professionals, cremation societies, monument companies, and the like.

An "authorization code," as used herein, refers to any combination of alpha-numeric digits. The digits are numeric, alphabetical, or any combination of numeric and alphabetical digits. Further, the digits may include symbols, such as ASCII ("American Standard Code for Information Interchange") characters. The authorization code is random, or alternatively, sequentially assigned. Moreover, the authorization code is unique, such that no two authorization codes are the same, e.g., the authorization codes on two certificates are different. Additionally, the authorization code can be associated with a user or a provider of a certificate bearing the authorization code. An example of the authorization code is: "12345678." In one embodiment, the authorization code is divided into two parts: a first part and a second part. An example of such an authorization code is: "12346 12346." In such an instance, the first part is indicative of the identity of the purchaser (and is unique for each different purchaser) and the second part is unique for each certificate. For example, the second part can be a sequential serial number that is assigned to each certificate for internal tracking and/or coding purposes. Thus, in one embodiment, the authorization code comprises the authorization code that is redeemed by the user and a serial number used for tracking and/or coding purposes.

For purposes of this disclosure, a "certificate" and a "brochure" are the same item, e.g., the item that contains the unique authorization code that can be used to purchase or receive an online product. Thus, as used herein, the terms certificate and brochure are used throughout this disclosure interchangeably. However, in one embodiment, the certificate and brochure are different in that a certificate entitles the user to a free use of an online product and the brochure entitles a user to purchase an online product at a discounted price or at the standard price. Further, in another embodiment, the brochure includes an authorization code that is used just for tracking purposes to identify from where the user was referred to the web site.

Figure 1:
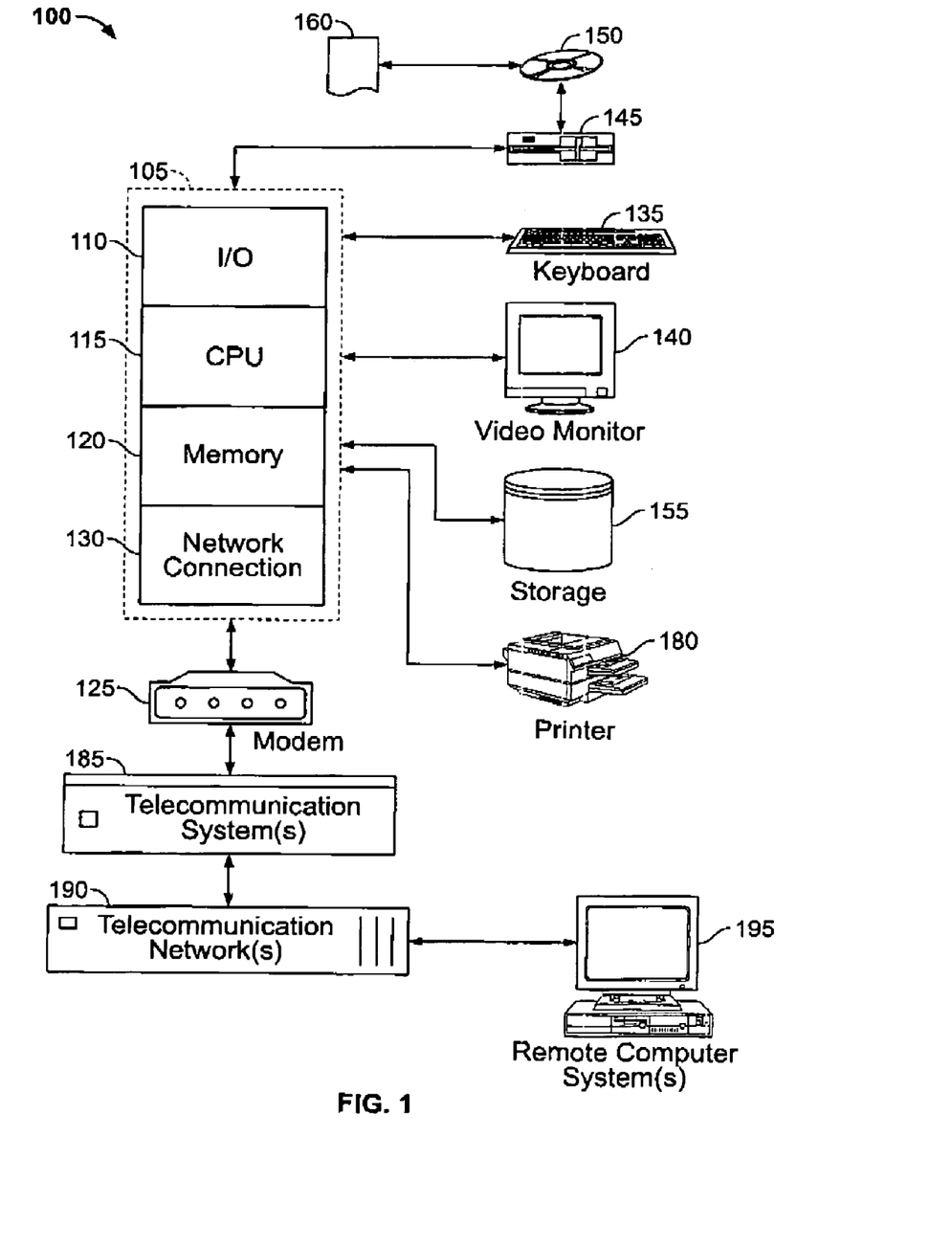
FIG. 1 is a diagram illustrating a portion of a computer, including a CPU, conventional memory, and communications hardware in which the present invention may be embodied.

FIG. 1 illustrates a computer 100 used in accordance with an embodiment of the present invention. A user logs onto a system of networked computers to redeem a certificate, such as by using computer 100. A general purpose workstation computer 100 comprises a processor 105 having an input/output ("I/O") section 110, a CPU 115, a memory section 120, and a network connection 130. Processor 105 is connected to a communications modem 125, a keyboard 135, a display unit 140, a storage disk 155 such as a database, and a CD-ROM or similar unit 145. The CD-ROM unit 145 reads a CD-ROM or similar medium 150, which typically contains programs and data 160. A printer 180 connects to processor 105. A telecommunications system 185 is connected to the system via modem 125 or some other communications device. This allows the system to connect to a telecommunication network 190, such that a user's computer 100 connects to a remote computer system 195. However, the present invention may work on a single or plurality of computers and/or may be locally or remotely operated.

The environment in which certificates of the present invention are redeemed comprises a system of networked computers, wherein general purpose computers, workstations, or personal computers, such as computer 100, are interconnected to remote computer system(s) 195 via communication links of various types, such as via telecommunication network(s) 190. Thus, a user's computer 100 is connected to other computers 195 over a modem, Ethernet connection, or other communications link. Electronic information transmitted from the user or other entities is sent from one such computer system 100 to other similar computer systems 195.

Figure 3:
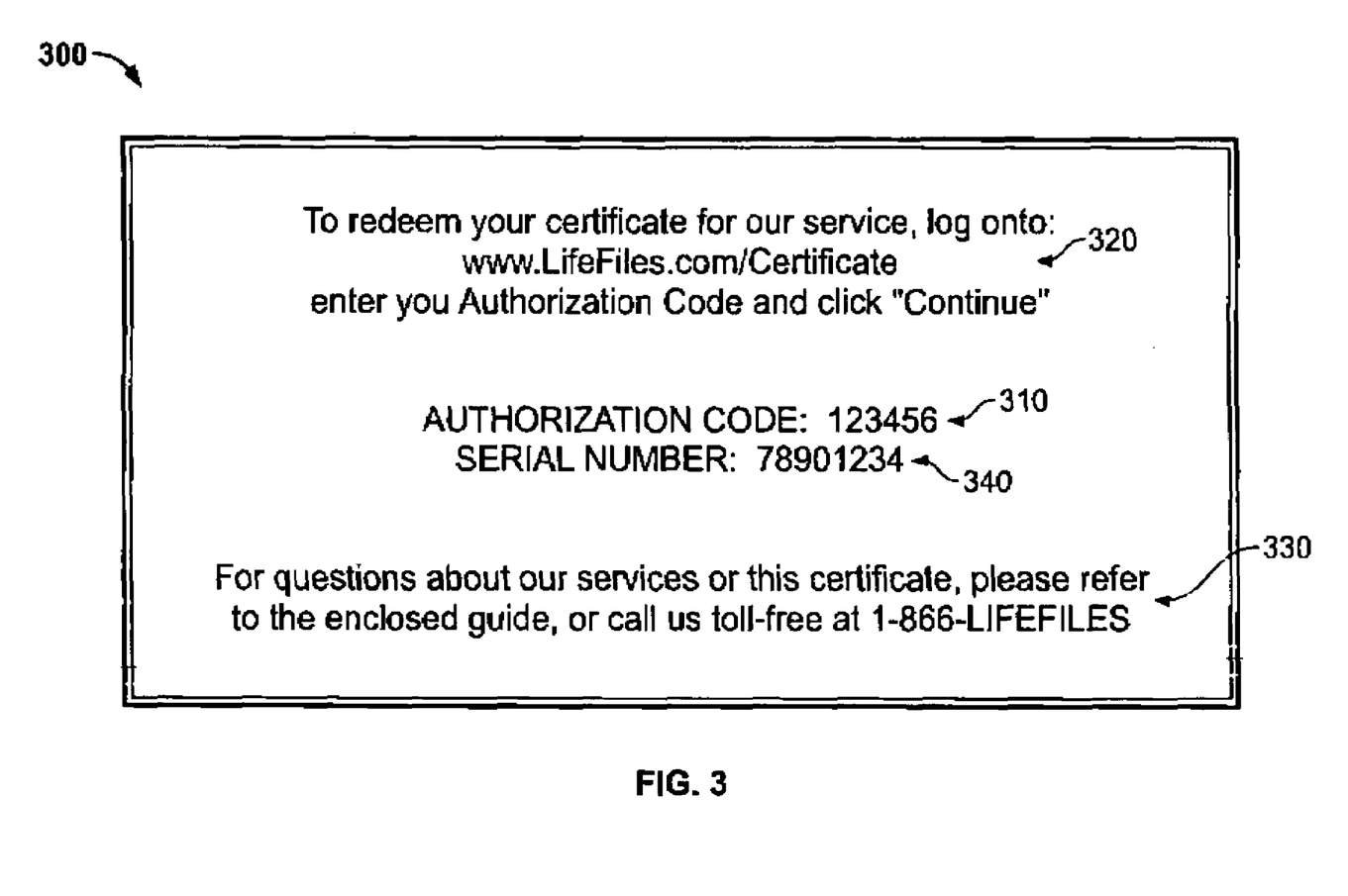
FIG. 3 is an example of a certificate according to one embodiment of the present invention.

According to an embodiment of the present invention, a user that holds a certificate for an online product or a purchaser that intends to purchase a certificate for an online product logs onto a system of networked computers and enters the system's web site, which is a web site associated with the certificate. In one embodiment, the web site is the same web site that provides the online product. Alternatively, the web site is a web site that manages certificates for the system. Additionally, the web site is identified on the certificate with instructions on how to redeem the certificate, such as shown in FIG. 3. Alternatively, the user arrives at the web site via a search engine or any other method for arriving at the system's web site. Alternatively still, a user can browse the system of networked computers and arrive at the system's web site, without a certificate. Further, the system can have the user enter the web site in a secure manner. Thus, a user may, in one embodiment, be prompted to enter a password or use some other security measure to access the web site.

If a purchaser has logged onto the system's web site, the purchaser may purchase a certificate from the system. The purchaser can be a user of the certificate by directly redeeming the certificate or alternatively, the purchaser sells the certificate to a user.

If a user has logged onto the system's web site, the user enters the authorization code found on the certificate, in the space indicated by the web site. Upon entering the authorization code, the system looks up in its database whether the authorization code is valid. After the system determines that the authorization code is valid, the system provides the online product to the user.

According to an embodiment of the present invention, there are different types of certificates, a "free certificate" that entitles the user to a free particular online product (such as a prepaid certificate); a "free option certificate" that entitles the user to a free online product of their choice; and a "non-free certificate" that entitles the user to an online product at a reduced fee or at the standard price. The non-free certificate provides the user with an online product at a reduced price if the purchaser of the certificate had obtained a deal with the system or provides the user with the online product at the standard price if no such deal had been obtained. Moreover, the authorization code on the certificate is used to record from where the user was referred to the web site, by having the user enter the authorization code that is associated with a particular purchaser when entering the web site of the system.

The free option certificate and the non-free certificate are distributed by the system, by purchasers that buy certificates in bulk, or by other purchasers. These certificates are sold by purchasers that pay for the certificates or receive the certificates from the system. Such purchasers may collect a commission when users redeem the certificates. Alternatively, the certificates are sold or provided directly by the system.

According to one embodiment of the present invention, the certificate is a LIFE LEGACY™ (Lifefiles.com, Inc.) free certificate. This certificate is available through selected purchasers, such as members of the funeral industry (such as funeral homes, cemeteries, other distribution channels, cremation societies, monument companies, and the like) and was paid for by the purchaser. The purchaser sells the certificate to a user, preferably at a profit. Each such certificate bears an authorization code and entitles the user thereof, upon activation of the certificate, to create a LIFE LEGACY™ tribute to a friend or loved one.

To activate a free certificate, the user is directed to the system's web site where he or she enters the authorization code on the system's web site. An authorization code is affixed to each certificate. The authorization code indicates that the user is in possession of a free certificate. If the authorization code is invalid, the user is directed to reenter the information. Authorization codes are kept on record by the system (such as at a financial department of the system) and as certificates are delivered to purchasers for sale, the financial department records which authorization codes are associated with which purchasers for tracking purposes.

According to another embodiment of the present invention, a free option certificate or non-free certificate may be a brochure, such as a LIFE LEGACY™ brochure. In some instances, purchasers will not hold certificates for sale, but will be given, distributed, or pay for a brochure that explains the product and directs the users thereof how to purchase the product or certificates for the product. Each of these certificates bear an authorization code. Like the free certificate, records are kept of which of the certificates go to each purchaser. To activate these certificates, the user is directed to the system's web site where he or she enters the authorization code into the system's web site. The user is directed to a product page and selects either the product or a certificate, such as a free certificate, for purchase.

Some purchasers (such as a hospice organization), may have obtained a discounted price from the system for their users (such as customers or families), in which case the authorization codes assigned to certificates of that purchaser will reflect a discounted retail price of the online product when the user of the certificate is asked to conclude his or her purchase and pay for the online product. If no discount is offered in connection with the certificates assigned to a particular purchaser, no discount will be reflected. If the user purchases an online product that is an online service, he or she is allowed to enter a web page to begin the utilization/creation process for the online service or is given the option to start the process at a later time. If a free certificate is purchased, the user enters the appropriate information and a free certificate is forwarded to him or her for their own use at a later date or to be given to another user.

The certificate for the online product contains a unique authorization code. The authorization code is associated with characteristics that are recorded for tracking purposes. For example, these characteristics include the identity of the entity that is to provide the certificate to a user (e.g., the purchaser), information relating to this entity, how much the certificate was sold for, to whom the certificate was sold, the date the certificate was sold, what type of certificate it is (e.g., a free certificate, non-free certificate, or free option certificate), information relating to the user of the certificate, and/or the like. A purchaser buys one certificate or a large quantity of certificates in bulk. For example, a purchaser can buy a plurality of certificates at a reduced rate from the system, and then sell the certificates to users at a profit. Alternatively, the purchaser is given certificates by the system to provide to users (such as non-free certificates). The purchaser sells the certificates to users, which could be at no charge. Alternatively still, the purchaser and the user are the same entity, such that the purchaser is the user that redeems the certificate(s). Alternatively still, the purchaser and user are different entities.

Moreover, by using the authorization code for tracking purposes, the web site and/or online product can be customized for the user by including information relating to the user on the online product. Such customization can include identifying the user by name, including links to particular sites that the system determines this user may find of interest, including customized advertisements for the user, including customized deals to the user, identifying businesses that are around the user's physical location, causing functions that are more appropriate for this user to be available on the web site and/or online product, or using other information relating to the user to customize the online product. Additionally, if the certificate was a non-free certificate provided to a user by an organization, upon redemption of the certificate, a donation (such as a percentage of the proceeds from the sale) can be made to the organization.

Alternatively, the certificate can be customized to include information relating to the purchaser. For example, if the authorization code indicated that the purchase was a particular hospice, for example "XYZ Hospice," the logo for XYZ Hospice may appear on the online product after the user redeems the certificate. Alternatively, information about XYZ Hospice, such as its history, location, or the like, can also appear on the online product. Moreover, a customized message can also appear on the online product, such as "Thank you for redeeming your certificate obtained from XYZ Hospice." Accordingly, the unique authorization code allows the system to track the certificate, such that when it is redeemed, the online product is customized.

Therefore, in one embodiment, the authorization code on the certificate is used by the system to track a user of the certificate and from where the user obtained the certificate (from the purchaser of the certificate), along with effectuating the redemption of the certificate. In another embodiment, the authorization code on the certificate is used to track the purchaser or user of the certificate, and then provide the user with online products at a discounted price and/or customize the online product for the user.

Figure 2:
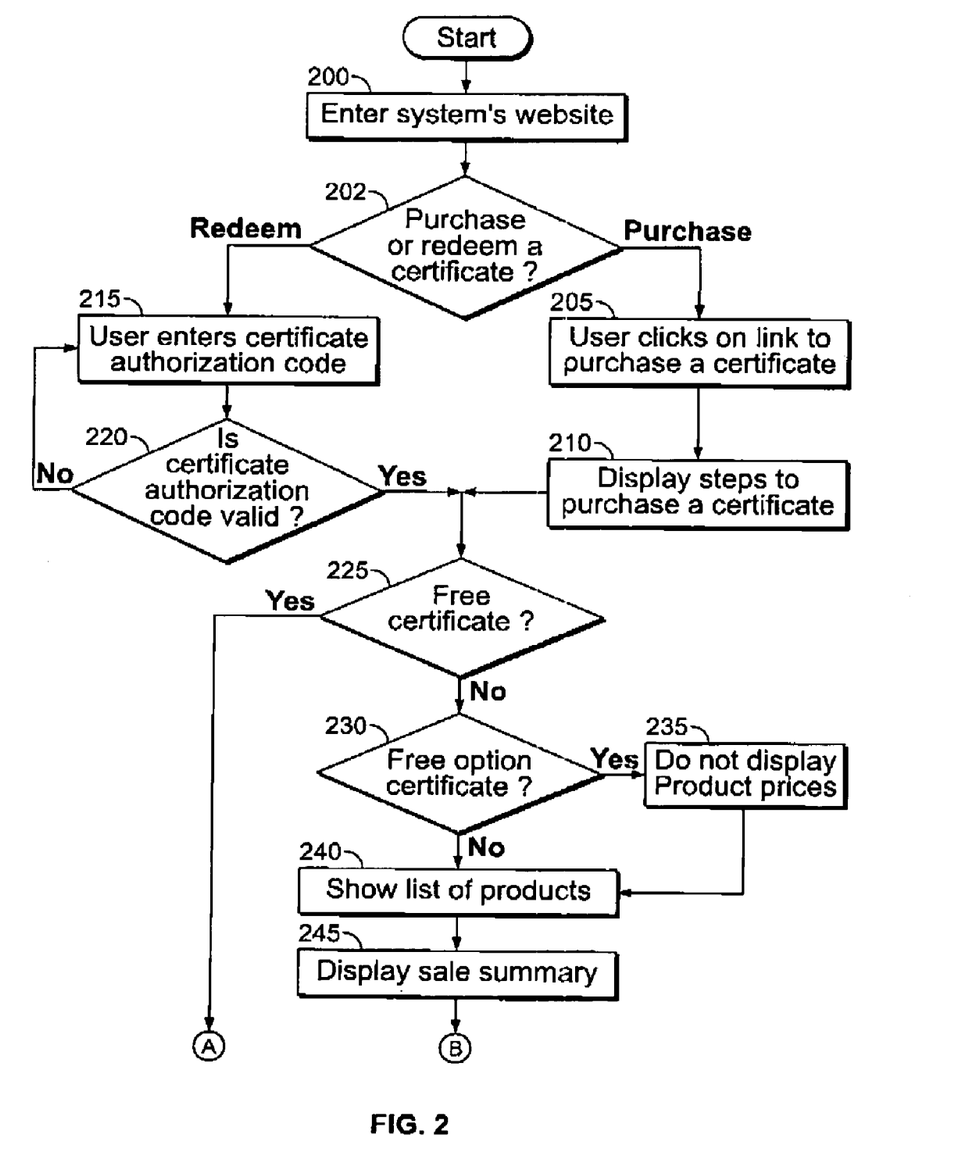
FIG. 2 is a flowchart illustrating one embodiment of the present invention.

FIG. 2 illustrates a flowchart of one embodiment of the present invention. The user arrives at the system's web site at 200. At 202, the system inquires whether the user is to redeem a certificate or purchase a certificate. If purchasing a certificate, the system proceeds to step 205. If redeeming a certificate, the system proceeds to 215.

At 205, a purchaser "clicks" on a link to purchase an online product. Thus, a purchaser may buy a certificate online from the system or may physically buy a certificate at a physical location.

At 210, the system display steps to purchase a certificate. The system initiates steps to authorize a unique authorization code that is associated the certificate. The unique authorization code allows the user to obtain the desired online product, while providing the system with the ability to track and record the certificate, its purchaser, whether it provides free online products or online products at a reduced rate, who receives the commission on the sale of the certificate (if a commission is to be provided to the purchaser), how many other certificates this purchaser has bought and/or possesses, and the like.

If redeeming a certificate, the system proceeds to 215. At 215, the user enters the web site and, where indicated on the web site, enters the certificate's authorization code. The certificate's authorization code is the authorization code that is found on the certificate.

At 220, the system determines if the certificate's authorization code is valid. This may be accomplished by comparing the authorization code entered by the user with a table of authorization codes stored with the system. Alternatively, if a user name was entered in addition to the authorization code, a list of valid authorization codes may be known by the system for that particular user name and thus the system checks if both the name and authorization code are valid. If the authorization code is not valid, the user is prompted to reenter the authorization code. If the authorization code is valid, then the user progresses to step 225.

At 225, the system determines if the authorization code was associated with a free certificate. If so, the system progresses to step 255. Otherwise, the system proceeds to 230.

At 230, the system determines if the authorization code was associated with a free option certificate. If so, the system removes all prices from the list of optional online products at 235 and displays the list to the user at 240. With a free option certificate, no prices are shown next to the choices of the online products. The online products are displayed such that user merely "clicks" on the online product that he or she desires.

If at 230, the system determines that the authorization code was not associated with a free option certificate or a free certificate. Thus, the user either held a non-free certificate or did not have any certificate.

The system then progresses to 240 to display the list of optional online products that the user may elect to receive. Moreover, the system may control, based on the authorization code, from which list of online products the user is to choose. Prices are shown next to the choice of online products. The prices may be reduced if the user held a non-free certificate that provided reduced fees. If the user did not enter the web site with a certificate, or used a non-free certificate that did not provide reduced fees, then the standard prices are shown. The user then selects which online product he or she desires. If there is only one online product, step 240 is not necessary.

Additionally at 240, the system may request further information about the user. For example, the system may request information on whom the online product is intended, information about the user, and the like.

At 245, the system displays a summary of the purchases that the user is making, and if applicable, the total amount the user owes. The system prompts the user for verification that the summary of the purchase is correct. If the information is incorrect, the user can make any necessary modifications.

At 250, the system determines if the user desires to purchase a certificate or immediately use/receive the online product. In one example, the user may purchase a free certificate or a non-free certificate that includes reduced prices instead of directly purchasing the online product.

When purchasing a certificate, the certificate is sent to a desired recipient, which may be the user him or herself or may be another entity, if for example the certificate was intended as a gift. Alternatively, such a user may desire to immediately purchase the online product. The user may make such an election at this step. If the user purchased a certificate, the system proceeds to step 280 to finalize payment of the transaction. Additionally, the system may gather information from the user at this step, such as where and to whom to send the certificate.

If the user was to receive and/or purchase the online product, at 255, the user receives and takes advantage of the online product. For example, if the user had received a LIFE LEGACY™, the user may enter information about the individual or deceased the LIFE LEGACY™ is intended, upload images or videos of the individual or deceased, or the like. If the user received some other service, information needed to utilize the service is provided. Alternatively, if the online product that was purchased is a good, the user receives the good purchased at this step.

At 260, the user confirms that the information entered for the online product at 255 was correct. The user may be shown a summary of the entered information and be prompted to add any additional information. In one embodiment, the user sees a preview of the online product he or she purchased. For example, if purchasing an online service such as a web page, a preview of the web page is displayed.

At 270 the system checks to see if a payment needs to be collected from the user. If no such payment need be collected, the system progresses to step 290 and the system records information about the user and the transaction in the system's database. The recorded information at 290 may include, for example, an indication that the authorization code is no longer valid (as it has now been used), an update to any commissions to be paid (if applicable) and to whom, an email notification that the process is complete, and the like.

If a payment need be collected from the user, at 280, the system prompts the user to enter credit card information, a billing address, and/or information required for other payment options. For example, if paying by check or money order, the system may require information such as the checking account number.

At 285, the system confirms that the information is correct and processes the credit card, if payment was to be made via a credit card. The system also confirms that the credit card was valid. If the credit card was not valid, the system prompts the user to either enter a different credit card, choose another payment option, or abort the process. If a user elected to pay via some other means, the system would perform any other necessary steps to finalize the transaction during 285. If the payment is successfully made the system records information similar to step 290 and proceeds to step 295. If the user fails to make the necessary payment, then the online product is not provided to the user and/or the purchase is cancelled. In such an instance, the system may update its information to indicate that the authorization code has not been used and/or is still valid.

At 295, the transaction is complete. The system displays a "thank you" message. This message can be customized based on the purchaser of the certificate that provided the certificate to the user, such as "Thank you for your XYZ Hospice purchase." If the user had purchased the online product, as performed in step 255, the user may log onto the web site to view/use their online product. If the user purchased a certificate, such certificate is sent to the desired recipient, as selected by the user.

Referring to FIG. 3, an embodiment of a certificate 300 used in the present invention is shown. Certificate 300 includes instructions 320 to a user on how to redeem the certificate. Instructions 320 includes the URL where a user can redeem the certificate. Authorization code 310 is also included on certificate 300. In this embodiment, the authorization code is "123456." Also included on certificate 300 is a serial number 340. Serial number 340 is a number that is used for tracking the certificate and in this embodiment is "78901234." Authorization code 310 is the number that is used by the user to redeem certification 300 and serial number 340 is a tracking number assigned to certificate 300. Alternatively, the serial number is not included on the certificate and the authorization code is used to track the certificate. Alternatively still, the authorization code comprises both the authorization code and the serial number.

Contact information 330 is optionally provided on certificate 300. Contact information 330 includes a telephone number or a web page such that users may contact the system for more information. Additionally, other customer service options for a user using the online product may also be included on certificate 300. Such other customer service options include an address, a non toll-free telephone number, and/or an email address such that customers can contact the system with questions.

Certificate 300 can be a single paged coupon or include multiple pages of material. Certificate 300 can be constructed out of paper or some other heavy stock material. If certificate 300 includes additional pages of material, certificate 300 can be in a book form or have the pages otherwise connected together, such as via staples or paper clips.

In addition, certificate 300 can include other information regarding the online product. For example, certificate 300 can be a brochure or certificate, such as a free certificate, free option certificate, or a non-free certificate. In one embodiment, the first page of certificate 300 includes detailed information about the online product. Additionally, information regarding the secure manner in which the online product is used can also be described in certificate 300. For example, the secure manner can include a user ID and password protection. Certificate 300 can also include a convenient location in which a user may record such passwords. Recording such information on the certificate is useful because the user does not need to turn over the certificate to any party to redeem the certificate. The user holds the certificate even after it is redeemed and thus recording passwords on the certificate provides a convenient way to maintain the passwords.

Further features may also be provided in certificate 300. For example, certificate 300 can include information on how the user may utilize the online product. If the online product is a LIFE LEGACY™, information may be included on how this online product provides a way in which one close to a deceased may manage his or her grief.

Moreover, certificate 300 can also mention other online products that a user may purchase in addition to the online product that the user is receiving via the certificate. Certificate 300 can further include frequently asked questions that may assist a user utilizing the online product. This allows a convenient and easy place for users to consult if they have questions regarding the certificate or the online product.

In one embodiment, certificate 300 is not redeemable for cash or money, but is only redeemable for the online product. Thus, if a certificate is lost or misplaced, the authorization code could be invalidated and a new certificate with a new authorization code can be provided to the user. Alternatively, the same authorization code can be used on the new certificate, such that if either certificate is redeemed, that authorization code is no longer valid for future use. Alternatively still, a user may receive multiple certificates with the same authorization code, such that if any one of the certificates is redeemed none of the other certificates are valid.

Figure 4:
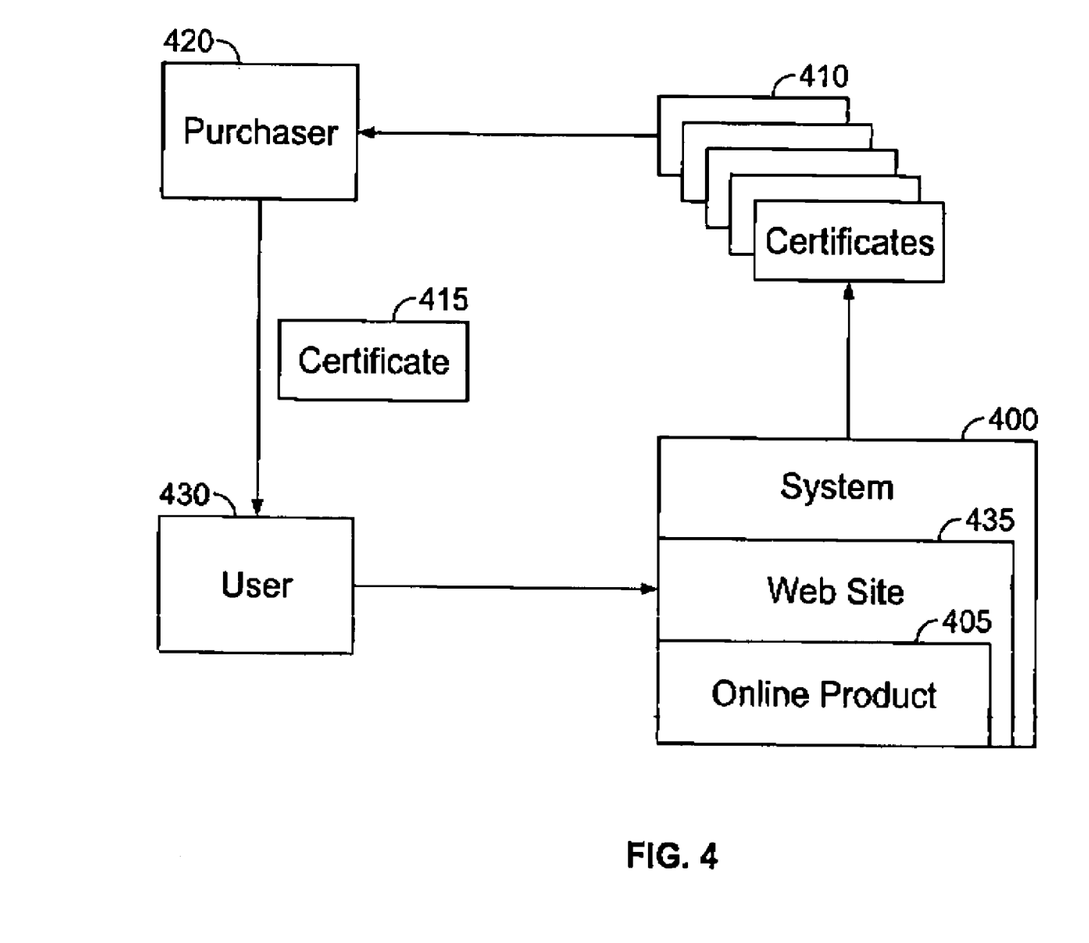
FIG. 4 is a block diagram illustrative of another embodiment of the present invention.

FIG. 4 illustrates a block diagram of another embodiment of the present invention. A system 400 provides an online product 405, such as an online service. Alternatively, the system 400 provides a certificate that is redeemable for an online product 405.

A purchaser 420 desires to obtain a plurality of certificates 410. The plurality of certificates 410 are redeemable for the online product 405. The purchaser 420 receives the plurality of certificates 410, by paying for the plurality of certificates 410 or by receiving the plurality of certificates 410 at no charge. In one embodiment, purchaser 420 buys the plurality of certificates 410 at a bulk discounted rate. Additionally, there can be a plurality of purchasers 420 that receive certificates 410 from system 400. In another embodiment, the purchaser 420 negotiates with system 400, such that plurality of certificates 410 are redeemable for the online product 405 by a user at a reduced fee.

The system 400 creates or has created the plurality of certificates 410, such that each of the certificates include a unique authorization code. The plurality of certificates 410 can be created before of after purchaser 420 receives the certificates 410. Additionally, the authorization code can be associated with characteristics of the purchaser 420, such that the system 400 knows which plurality of certificates 410 purchaser 420 has in its possession.

A user 430 desires one of the certificates 415 to obtain the online product 405. The user 430 purchases the certificate 415 from purchaser 420, such as when the certificate is a free certificate. In one embodiment, the user 430 is given the certificate 415 by purchaser 420, such as when the certificate is a non-free certificate. The certificate 415 is then provided to user 430. Additionally, when the user receives the certificate, the authorization code can be associated with the user such that when the certificate is redeemed, the online product is customized to the user. The user can provide the information relating to the user to be used to customize the certificate by, for example, filling out a form.

System 400 offers a web site 435 that allows a user to redeem its certificate 415. To redeem its certificate 415, the user 430 connects to the web site 435 associated with the certificate 415 over a system of networked computers. The web site 435 can be identified on the certificate 415. The user views the web site 435 and then enters the authorization code where indicated on web site 435. The online product 405 is then provided to the user. If certificate 415 was a free certificate or a free option certificate, the online product 405 is provided at no cost to the user. If certificate 415 was a non-free certificate, the user pays for the online product 405, preferably at a reduced fee.

In another embodiment, information about the certificate's authorization code is tracked for recording purposes. If a purchaser buys a number of certificates and sells one certificate to a user, the purchaser may receive a commission. If this same user purchases additional online products on the web site, the original purchaser may receive additional commissions for the additional online products that the user purchased. Thus, because the authorization code provides information regarding the original purchaser, additional commissions may be sent to the original purchaser based on future transactions of the various users that buy the purchaser's certificates.

In another embodiment, users that redeem a certificate may receive as part of the online product a license to use software over the system of networked computers, such as a license to use the system's software. In such an instance, the user receives a paid up license to use the software on the web site. Such license, for example, may contain various restrictions, such as restrictions on use or copying.

Moreover, the system may use an ASP ("Application Service Provider"). The certificate may allow a user to "rent" software from the system via the ASP for a specified time period, such as two years. An ASP allows an application to be downloaded from the Web each time it is run. Therefore, the application can be run from any computer, and the software is routinely upgraded and maintained by the system rather than each user. Additionally, the system may provide data space on the system's server for information the user provides. Thus, the certificate allows a user to prepay for software, utilization of ASPs, and the right to receive the online product for a specified time period (after the time period expires, the user may receive a bill and renew the online product). A user may purchase all of these online products without having to be online; the user merely purchases a physical certificate that entitles the user to these online products. When the user desires the online product, he or she enters the authorization code on the web site. Thus, the present invention allows users to obtain the benefits of the online product without being experienced in using web pages or other online services.

Even though throughout this disclosure, reference is made to the funeral industry, aspects of embodiments of the present invention are applicable to different industries. These other industries may be any industry that would benefit from the described present invention, for example the appliance industry or the electronics industry.

The methods and apparatus of the present invention, or certain aspects or portions thereof, may take the form of program code (e.g., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission (such as an electronic connection), wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The steps depicted in flow charts and methods herein may be performed in a different order than as depicted and/or stated. The steps shown herein are merely exemplary of the order these steps may occur. The steps shown herein may occur in any order that is desired, such that it still performs the goals of the claimed invention. Additionally, steps not desired to be used from the steps shown in the flow charts and methods may be eliminated, such that the goals of the claimed invention are still achieved.

All patents and publications described herein are hereby incorporated by reference to the same extent as if each individual patent or publication was specifically and individually indicated to be incorporated by reference.

The inventions illustratively described herein can suitably be practiced in the absence of any element or elements, limitation or limitations, not specifically disclosed herein. Thus, for example, the terms "comprising," "including", "containing", etc., shall be read expansively and without limitation. Additionally, the terms and expressions employed herein have been used as terms of description and not of limitation, and there is no intention in the use of such terms and expressions of excluding any equivalents of the future shown and described or portion thereof, but it is recognized that various modifications are possible within the scope of the invention claimed. Thus, it should be understood that although the present invention has been specifically disclosed by preferred embodiments and optional features, modification and variation of the inventions embodied therein can be used by those skilled in the art, and that such modifications and variations are considered to be within the scope of the inventions disclosed herein. The inventions have been described broadly and generically herein. Each of the narrower species and subgeneric groupings falling within the generic disclosure also form part of these inventions. This includes the generic description of each invention with a proviso or negative limitation removing any living being matter from the genus, regardless of whether or not the excised materials specifically resided herein. Other embodiments are within the following claims. In addition, where features or aspects of an invention are described in terms of the Markush group, those schooled in the art will recognize that the invention is also thereby described in terms of any individual member or subgroup of members of the Markush group.

From the description of the invention herein, it is manifest that various equivalents can be used to implement the concepts of the present invention without departing from its scope. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many equivalents, rearrangements, modifications, and substitutions without departing from the scope of the invention.

Thus, additional embodiments are within the scope of the invention and within the following claims.

We claim:

1. A method comprising the steps of:

receiving payment from an intermediate purchaser for at least one certificate for an online product of a vendor, each of the at least one certificate having an average first price, said certificate comprising an authorization code having at least one characteristic that identifies said intermediate purchaser;

providing said certificate in a physical form to said intermediate purchaser;

receiving, by a computing system connected to a computing network, entry of said authorization code on a web site via which said online product can be obtained, wherein said authorization code is entered on said web site by a user that bought from said intermediate purchaser one of the at least one certificate at a second price that is greater than the first price;

determining the identity of said intermediate purchaser from the authorization code received from said user; and upon granting authorization access to said user in response to entry of said authorization code, generating, by the computing system connected to the computing network, an on-line memorial for a deceased person.

2. The method of claim 1, wherein said one of the at least one certificate designates a specific online product of the vendor to be provided to the user.

3. The method of claim 1, wherein said online product pertains to the funeral industry.

4. The method of claim 1, wherein said one of the at least one certificate is made of paper.

5. The method of claim 4, wherein said one of the at least one certificate comprises multiple pages of material.

6. The method of claim 1, wherein said one of the at least one certificate entitles the user to obtain the online product at a reduced fee.

7. The method of claim 3 wherein said online product includes generating the on-line memorial for the deceased person.

8. The method of claim 1, wherein said average first price is zero.

* * * * *

UNITED STATES PATENT AND TRADEMARK OFFICE
CERTIFICATE OF CORRECTION

PATENT NO. : 7,647,244 B2
APPLICATION NO. : 09/888345
DATED : January 12, 2010
INVENTOR(S) : Platner et al.

It is certified that error appears in the above-identified patent and that said Letters Patent is hereby corrected as shown below:

On the Title Pg,

Item [*] Notice: Subject to any disclaimer, the term of this patent is extended or adjusted under 35 USC 154(b) by (517) days Delete the phrase "by 517 days" and insert -- by 767 days --

Signed and Sealed this

Eighteenth Day of May, 2010

David J. Kappos
*Director of the United States Patent and Trademark Office*